Patented Apr. 20, 1954

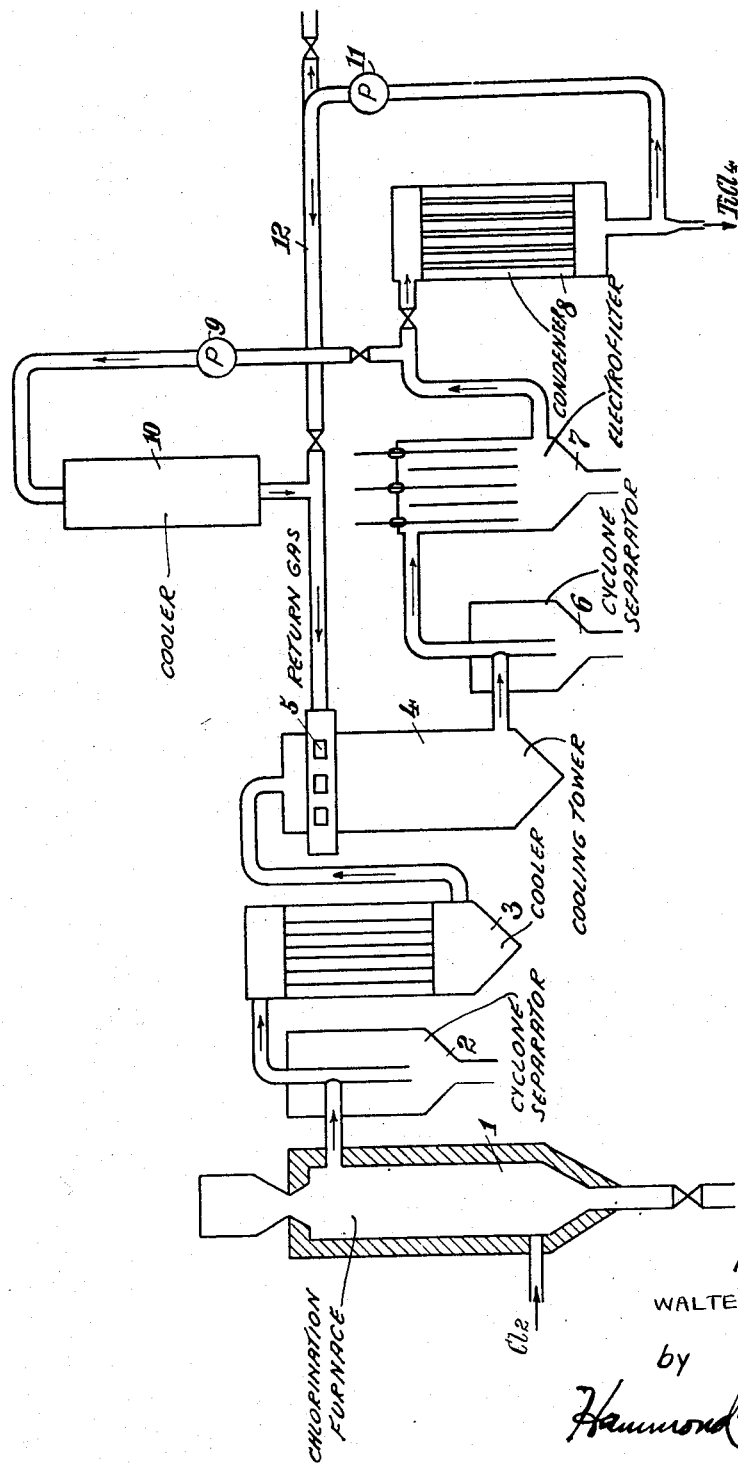

2,675,889

UNITED STATES PATENT OFFICE 2,675,889

METHOD FOR PROCESSING CRUDE GASES OBTAINED ON HALOGENATING METALLIC ORES

Walter Frey, Basel, Switzerland, assignor to Saurefabrik Schweizerhall, Schweizerhalle, Switzerland Application March 22, 1950, Serial No. 151,244

Claims priority, application Switzerland April 1, 1949

2 Claims. (Cl. 183—119)

The present invention relates to a method of processing crude gases obtained on halogenating ores in the presence of carbon as reducing agent. It relates especially to the chlorination of ores and minerals, such as titanium ores, whereby the volatile metal chlorides present in the crude gases are condensed. The crude gas formed, for instance, on chlorinating rutile, ilmenite, and the like, contains, in addition to those gases which under normal conditions cannot be condensed, such as carbon monoxide, carbon dioxide, hydrogen chloride, chlorine and the like, volatile metal chlorides condensing in the liquid state, such as titanium tetrachloride, which will be called hereafter liquid chlorides, as well as chlorides condensing in the solid state, such as iron, aluminum, and zirconium chlorides, which will be called hereafter solid chlorides even when in vapor form. Furthermore said chlorination gases also contain certain amounts of ore and coal dust. Since said chlorides are condensing at rather different temperatures it has proved to be of advantage to recover separately the liquid and the solid chlorides.

Separate condensation of said chlorides, however, brings about great difficulties; for, the solid chlorides, such as iron and zirconium chloride, precipitate on indirect cooling on the walls of the apparatus where they form crusts, thereby impairing heat transfer and causing clogging of the pipes.

It has already been suggested to first cool the reaction gas to a temperature not lower than slightly above the precipitation point of the solid metal chlorides and then to inject into the gas a liquid, especially a liquid metal halide. The amount of the liquid to be injected has to be regulated in such a manner that the solid metal chlorides are almost completely condensed while at the same time the entire amount of the injected liquid metal halide is evaporated. Subsequently the solid metal chlorides can be removed in a dry state from the gas. By this process it is possible to precipitate the solid metal chlorides in finely divided suspension in the gas and to prevent adhering of the same to the walls of the apparatus. Carrying out this process industrially, however, involves many difficulties, especially when the liquid to be injected into the reaction gas is the liquid chloride produced in the chlorination process, for example, liquid titanium tetrachloride for processing crude gases of the chlorination of titanium ores.

Satisfactory operation according to said process on an industrial scale depends to a large extent upon a very exact regulation of the amount and the temperature of the liquid injected. In such a process, this regulation must continuously be adapted to the composition of the ore and to the reaction conditions of the chlorinating process since the conditions under which the various chlorides precipitate depend to a large extent upon these two factors. Furthermore complete evaporation of drops of the liquid, for instance, of titanium tetrachloride, can hardly be achieved at a temperature only slightly above the dew point of said chloride. The danger that the liquid chloride is also precipitated together with the solid metal chloride or that the precipitation of the solid chloride does not take place completely, is very great especially when using ores containing only very small amounts of iron or zirconium. If the conditions under which precipitation takes place are not observed exactly there immediately occur disturbances within the apparatus, such as incrustations, cloggings, formations of smears and the like.

Now the main object of the present invention consists in overcoming said difficulties. This is achieved by cooling the crude gases of the chlorinating process, preferably after they have been cooled to a temperature not lower than slightly higher (1° C. or preferably 5° to 10° C. or more) than the point of precipitation of the solid metal chlorides, by the admixture of a colder gas. Thereby a temperature is to be reached which is near the lowest point of the range of temperature within which condensation of the solid metal chlorides present in said chlorination gases takes place, but which must be, at the lowermost, slightly higher (1° C. or preferably 5° to 10° C. or more) than the dew point of the liquid metal chlorides present in the gases. Thereafter the precipitated solid metal chlorides are removed from the gases in dry form whereupon the liquid metal chlorides are condensed.

The admixture of a colder gas to the chlorination gases has the advantage that the difference between the point of precipitation of the solid metal chlorides and the dew point of the liquid metal chlorides is affected only to a very small extent. If, for instance, a gas which is inert to the chlorination gases, such as carbon monoxide, carbon dioxide, nitrogen, or a chlorination gas from which the solid and the liquid metal chlorides have been removed, is added, the points of precipitation of the solid chlorides as well as the dew points of the liquid chlorides are decreased in about the same proportion. Although the admixture of such a return gas represents a very preferable means of carrying out this process, it is, of course, also possible to make use of a chlorination gas which is freed at least of all its contents of condensable solid metal chlorides while it still contains at least part of its contents of liquid metal chlorides in vapor form. The temperature of such a gas to be returned into the process must, of course, be above the dew point of the liquid metal chloride contained therein. In this case, naturally, there is decreased only the point of precipitation of the solid chloride while the dew point of the liquid chloride remains approximately constant. But also under such circumstances the difference in the points of precipitation is still large enough so as to achieve good separation. The greatest advantage obtained by admixing said gases is to be seen in the fact that the cooling process can be carried out quite safely even on large scale production. The danger that the liquid metal chlorides precipitate together with the solid metal chlorides is very small. It actually does not exist at all on cooling with a gas to be returned into the process which still contains liquid chlorides in vapor form. Admixture of cooling gas requires, however, carefully adjusting the gas current (e. g. with rotameters) and regulating its temperature (e. g. with a thermostat); but these adjustments can be made with rather simple means. Hence, the process can be managed quite easily.

It is also possible to add cold gas directly to the chlorination gas when leaving the chlorinating furnace, and thereby to decrease the temperature to a point near the dew point of the liquid metal chloride. This requires, however, addition of large amounts of gas. Therefore, the chlorination gas is preferably pre-cooled as stated above, but only to a temperature near the point at which the solid chlorides start to precipitate.

The process of this invention may be illustrated by the following example and by means of the drawing of a diagrammatic view of the apparatus used without, however, limiting the same to them.

100 parts of a rutile ore containing 96% of $TiO_2$, 1% of $ZrO_2$, 1% of FeO, and 2% of $SiO_2$, are converted into briquettes by means of 40 parts of coke and 10 parts of pitch. Said briquettes are calcined in a reducing atmosphere at a temperature of 800° to 1000° C. and are then chlorinated in the chlorinating furnace 1 at a temperature of 900° C. The furnace is charged with 180 kgs. of briquettes per hour. The crude gases consisting of about 30% by volume of $TiCl_4$, 50 to 60% of CO, 5 to 10% of $CO_2$, 5 to 10% of HCl, about 1% of $ZrCl_4$, and about 1% of $FeCl_3$, leave the furnace with a temperature of 850° C. and are freed of coal and ore dust in the cyclone 2. After leaving the latter the gases which are still 800° C. hot are conducted into the cooler 3 in which they are cooled to about 250° C. Thereafter the gas is introduced at the top into the cooling tower 4 (0.80 meter in diameter and 3.00 meters in height). Into this tower there are also introduced through the annular channel 5 about 1,000 kgs. per hour of a return gas containing titanium tetrachloride vapors and being of a temperature of 110° C. Thereby a temperature of the gas mixture of 140° C. is reached. By this procedure 95–98% of the iron and zirconium chlorides condense. They are subsequently removed from the gas by the dust separators, namely the cyclone 6 and the electrofilter 7, said apparatus being provided with heat jackets and being kept at a temperature of 140° C. One fourth of the remaining gas is passed into the condenser 8 in which the titanium tetrachloride is condensed while the other three fourths are passed through the fan or pump 9 and are cooled in the cooler 10 to a temperature of 110° C. The cooled gas is then introduced into the second cooling tower 4 as stated above.

In the alternative, by means of the fan or pump 11 and the pipe line 12 it is also possible to pass through the cooling tower 4 gas of room or even lower temperature which has been partly or completely freed of titanium tetrachloride vapors.

The cooling of the return gas in the cooler 10 may be carried out indirectly, for instance, by means of cooled pipes, or directly, for instance, by injecting titanium tetrachloride into the gas.

Of course, many changes and variations may be made in the reaction conditions, the cooling agents employed, the apparatus used, the method of working up the chlorination gases and the like. All these changes and variations that may be made by those skilled in the art, must comply, however, with the requirements of the principles set forth herein and in the claims annexed hereto.

It is, of course, understood that the expressions "chlorination" and "metal chlorides" do not only designate said halogen, but that the process according to the present invention may also be employed for any other halogenation of ores and with any other halogen than chlorine.

It will be understood further that the expression "cooling gas inert to said chlorides" designates a cooling gas which does not react with the normally liquid or the normally solid metal chlorides produced in the chlorination process.

What I claim is:

1. In the processing of hot gases produced by the chlorination of metalliferous material in the presence of carbonaceous reducing material and containing at least one vaporized normally liquid metal chloride from the group consisting of titanium and silicon chlorides and at least one vaporized normally solid metal chloride from the group consisting of ferric, aluminum and zirconium chlorides, the steps which comprise, after cooling the gases to a temperature near but above the highest condensation temperature of said normally solid metal chloride content, passing the gases into an advanced cooling zone and therein cooling them from such temperature to a temperature slightly above the highest condensation temperature of the normally liquid metal chloride content predominantly by mixing with said gases a cooling gas inert to said chlorides, thereby condensing solid metal chloride in the gases in a dry and readily separable form, separating condensed normally solid metal chloride from the gases, then further cooling the gases to condense normally liquid metal chloride, and returning part of the gases then remaining for admixture with further chlorination gases as the aforesaid cooling gas.

2. In the processing of hot gases produced by the chlorination of titaniferous material in the presence of carbonaceous reducing material and containing a plurality of vaporized metal chlorides including titanium chloride and ferric chloride vapors, the steps which comprise, after cooling the gases to a temperature slightly above the condensation temperature of the ferric chloride content, passing the gases into an advanced cooling zone and therein cooling them from such temperature to a temperature slightly above the dew point of the titanium chloride content predominantly by mixing with said gases a cooling gas inert to said chlorides, thereby condensing normally solid metal chloride in the gases in a dry and readily separable form, separating such condensed solid chloride in dry form from the residual gases, thereafter cooling at least part of the residual gases to condense titanium chloride therefrom, and returning part of the gases then remaining for admixture with further chlorination gases as the aforesaid cooling gas.

References Cited in the file of this patent

UNITED STATES PATENTS

| Number | Name | Date |
|---|---|---|
| 1,478,750 | McElroy | Dec. 25, 1923 |
| 1,917,725 | Lenander | July 11, 1933 |
| 2,134,702 | Brewster | Nov. 1, 1938 |
| 2,134,885 | Muskat et al. | Dec. 26, 1939 |
| 2,245,358 | Pechukas | June 10, 1941 |
| 2,306,184 | Pechukas | Dec. 22, 1942 |
| 2,311,466 | Pechukas | Feb. 16, 1943 |
| 2,378,675 | Agnew et al. | June 19, 1945 |
| 2,579,498 | Jenny | Dec. 25, 1951 |

FOREIGN PATENTS

| Number | Country | Date |
|---|---|---|
| 550,750 | Great Britain | Jan. 22, 1943 |

OTHER REFERENCES

Publication—"Handbook of Chemistry and Physics," 28th Ed., by C. D. Hodgman, Chem. Rubber Pub. Co., Cleveland, pp. 480–481, 394–395, 490–491, 336–337. Copy in Div. 59.